(12) United States Patent
Lee et al.

(10) Patent No.: US 6,216,195 B1
(45) Date of Patent: Apr. 10, 2001

(54) DOCKING STATION FOR A NOTEBOOK COMPUTER

(75) Inventors: Chia-Chun Lee; Ming-Hsun Chou; Jui-Jung Huang; Chih-Wen Chiang, all of Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 09/240,594

(22) Filed: Feb. 1, 1999

(51) Int. Cl.$^7$ ........................................................ G06F 1/16
(52) U.S. Cl. ............................ 710/129; 710/101; 361/687
(58) Field of Search ..................... 361/679–686; 710/129, 101

(56) References Cited

U.S. PATENT DOCUMENTS

| | | | |
|---|---|---|---|
| 5,436,792 | * | 7/1995 | Leman et al. ........................ 361/686 |
| 5,535,093 | * | 7/1996 | Noguchi et al. ..................... 361/686 |
| 5,557,562 | * | 9/1996 | Yoshiharu et al. ................ 364/708.1 |
| 5,882,220 | * | 3/1999 | Horii et al. ......................... 439/297 |
| 5,933,321 | * | 8/1999 | Ruch et al. . | |
| 6,069,790 | * | 5/2000 | Howell et al. ....................... 361/686 |

\* cited by examiner

Primary Examiner—David A. Wiley
(74) Attorney, Agent, or Firm—Pillsbury Winthrop LLP (57) ABSTRACT

A docking station for a notebook computer includes a housing and an ejector device. The housing has a front wall disposed adjacent to and parallel to a rear wall of the notebook computer. The front wall is formed with an ejector opening and an access opening. The ejector device includes an elongate linking arm, an ejecting member, and a biasing member. The linking arm, which is disposed in the housing and parallel to the front wall, is movable in the housing in a longitudinal direction between operated and non-operated positions. The linking arm has a connecting end and an operating end accessible via the access opening to permit movement of the linking arm from the non-operated position to the operated position. The ejecting member, which is disposed in the housing adjacent to the ejector opening, has a first pivot portion connected pivotally to the connecting end of the linking arm, a second pivot portion connected pivotally to the housing, and an ejecting portion that is retracted in the housing when the linking arm is in the non-operated position, and that extends out of the housing via the ejector opening so as to push the rear wall of the notebook computer away from the front wall when the linking arm is in the operated position. The biasing member provides a force for biasing the linking arm to the non-operated position.

17 Claims, 7 Drawing Sheets

DOCKING STATION FOR A NOTEBOOK COMPUTER

BACKGROUND OF THE INVENTION

1. Field of the Invention

The invention relates to a docking station for a notebook computer, more particularly to a docking station that facilitates detaching of the notebook computer from the docking station.

2. Description of the Related Art

A docking station is used with a notebook computer as a way of expanding the functions of the notebook computer. Because the docking station is connected electrically and mechanically to the notebook computer, there is always a need to facilitate detaching of the notebook computer from the docking station.

SUMMARY OF THE INVENTION

Therefore, the main object of the present invention is to provide a docking station that permits convenient removal of a notebook computer therefrom.

According to this invention, a docking station is adapted for use with a notebook computer that has a rear wall provided with a first connector set. The rear wall defines a longitudinal axis. The docking station comprises a housing and an ejector device.

The housing has a front wall adapted to be disposed adjacent to and parallel to the rear wall of the notebook computer. The front wall is provided with a second connector set that is adapted to connect electrically and mechanically with the first connector set. The front wall is formed with an ejector opening. The housing is further formed with an access opening.

The ejector device includes an elongate linking arm, an ejecting member, and a biasing member. The linking arm is disposed in the housing and is parallel to the front wall. The linking arm is movable in the housing in a longitudinal direction between operated and non-operated positions. The linking arm has a connecting end and an operating end accessible via the access opening to permit movement of the linking arm from the non-operated position to the operated position. The ejecting member is disposed in the housing adjacent to the ejector opening. The ejecting member has a first pivot portion connected pivotally to the connecting end of the linking arm, a second pivot portion connected pivotally to the housing, and an ejecting portion that is retracted in the housing when the linking arm is in the non-operated position, and that extends out of the housing via the ejector opening so as to be adapted to push the rear wall of the notebook computer away from the front wall when the linking arm is in the operated position. The biasing member is used for biasing the linking arm to the non-operated position.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
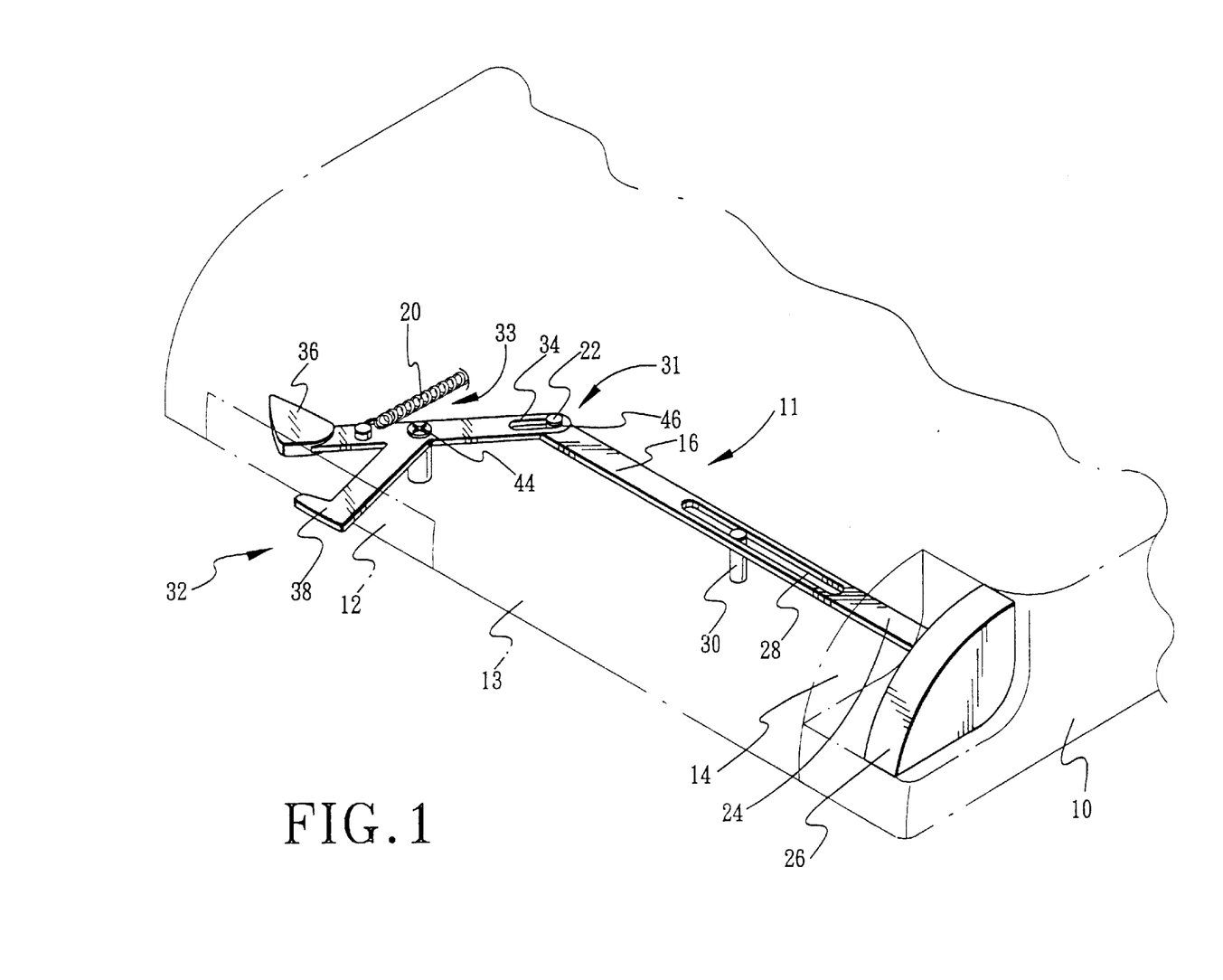
FIG. 1 is a fragmentary perspective view showing a first preferred embodiment of a docking station for a notebook computer according to this invention.
Figure 2:
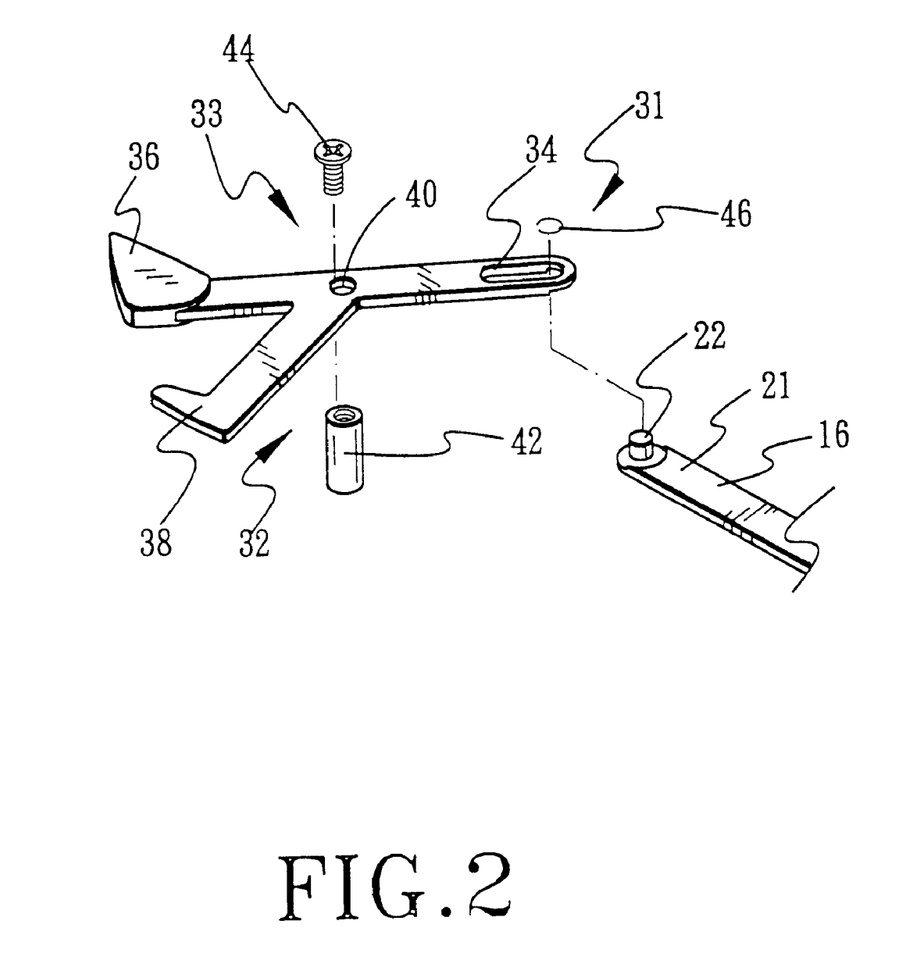
FIG. 2 is a fragmentary exploded perspective view showing the first preferred embodiment of this invention.
Figure 3:
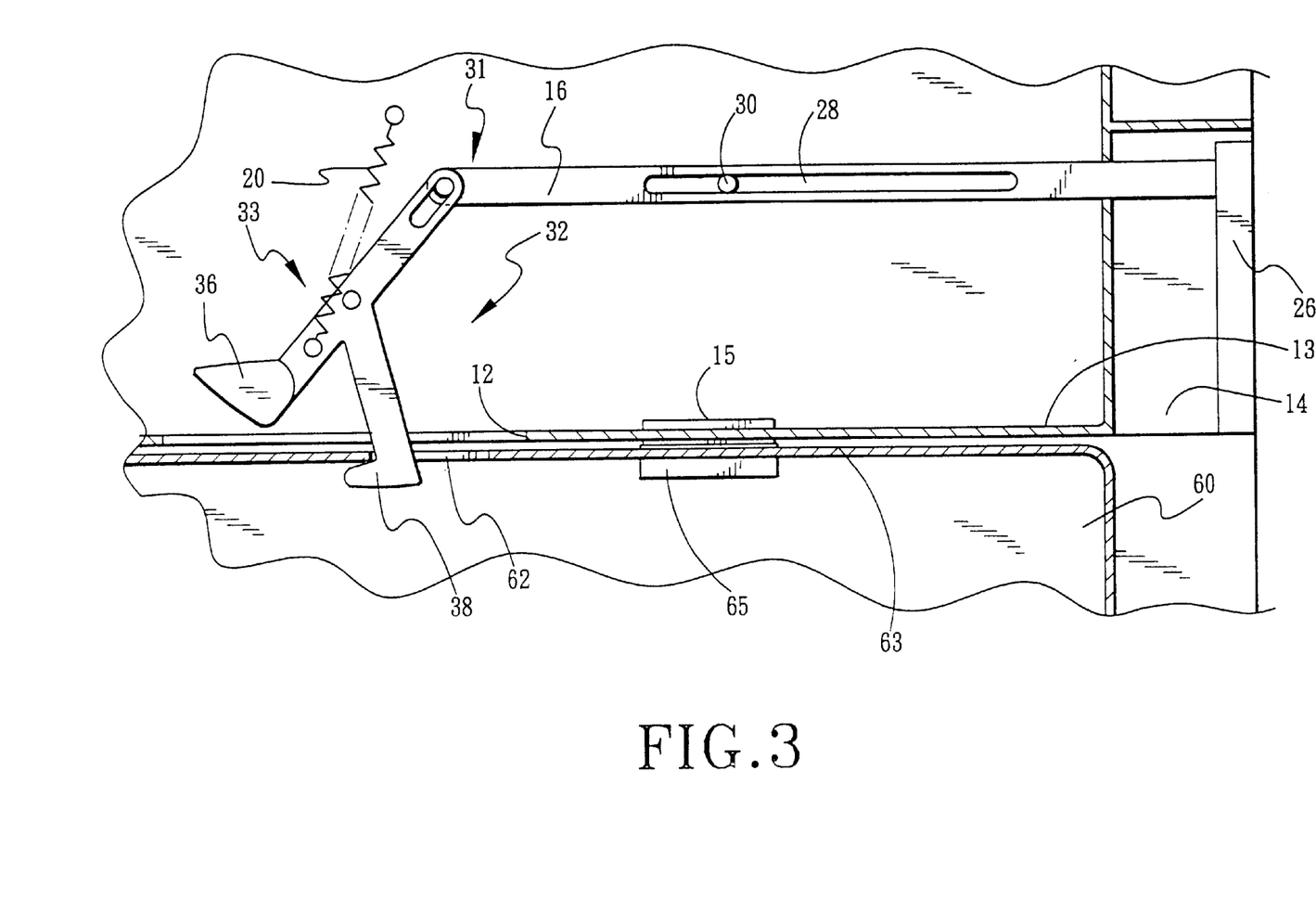
FIG. 3 is a schematic view showing the first preferred embodiment in a non-operated position.

Referring to FIGS. 1, 2, and 3, according to the first preferred embodiment of this invention, a docking station is adapted for use with a notebook computer 60 that has a rear wall 63 provided with a first connector set 65 and an engaging hole 62. The docking station comprises a housing 10 and an ejector device 11.

The housing 10 has a front wall 13 adapted to be disposed adjacent to and parallel to the rear wall 63 of the notebook computer 60. The front wall 13 is provided with a second connector set 15 that is adapted to connect electrically and mechanically with the first connector set 65. The front wall 15 is formed with an ejector opening 12. The housing 10 is further formed with an access opening 14 in the front wall 13. The access opening 14 is spaced apart from the ejector opening 12 in a longitudinal direction.

Figure 4:
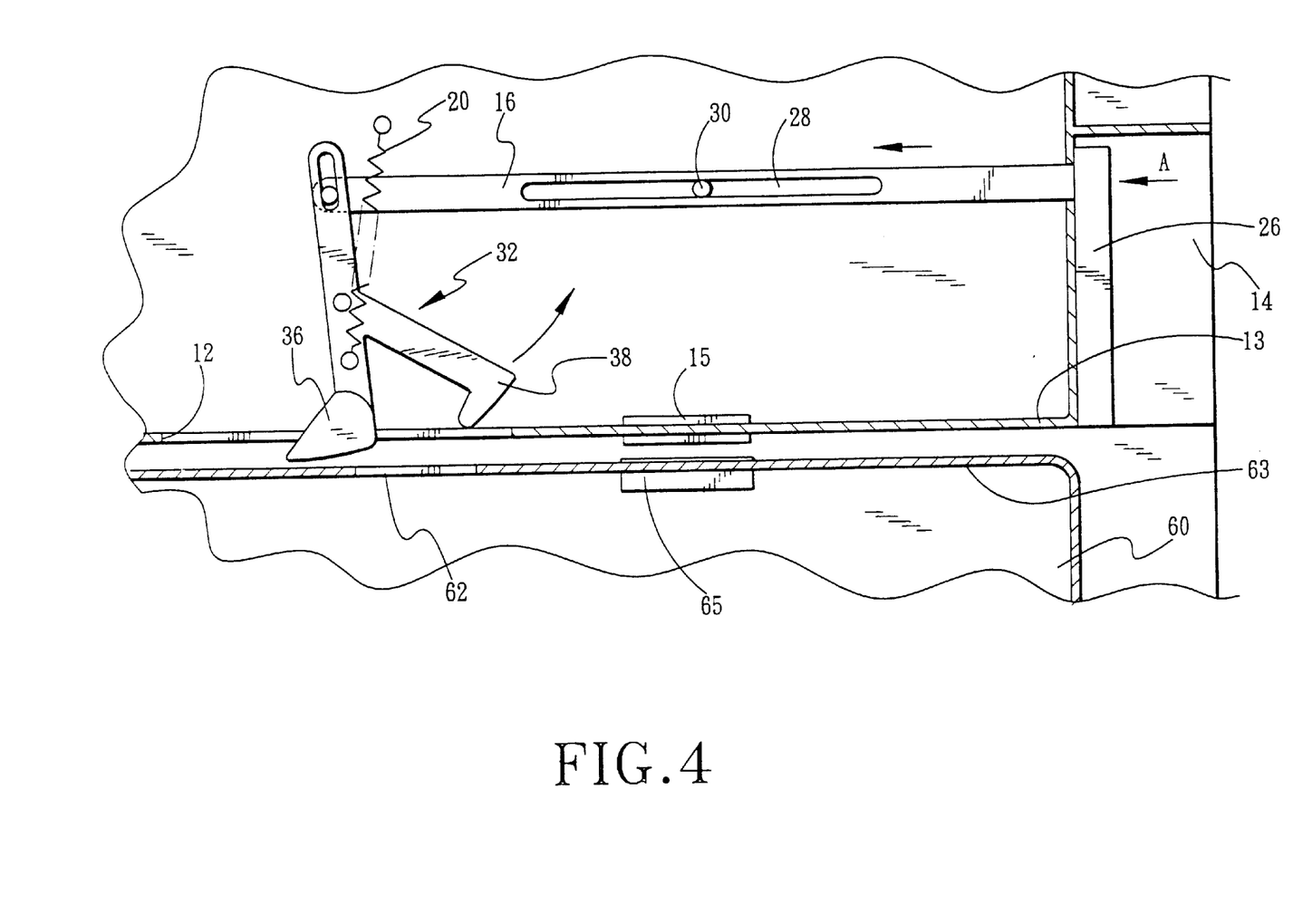
FIG. 4 is a schematic view showing the first preferred embodiment in an operated position.

The ejector device 11 includes an elongate linking arm 16, an ejecting member 32, and a coil spring 20. The linking arm 16 is disposed in the housing 10 and parallel to the front wall 13. The linking arm 16 is movable in the housing 10 in a longitudinal direction between operated and non-operated positions. The linking arm 16 is formed with a longitudinal slot 28. The housing 10 is formed with a guide pin 30 that extends into the slot 28 to guide movement of the linking arm 16 in the longitudinal direction. The linking arm 16 has a connecting end 21 and an operating end 24 accessible via the access opening 14 to permit movement of the linking arm 16 from the non-operated position to the operated position. Preferably, the operating end 24 of the linking arm 16 has an operating cap 26 mounted thereon. The ejecting member 32 is disposed in the housing 10 adjacent to the ejector opening 12. The ejecting member 32 has a first pivot portion 31, a second pivot portion 33, an ejecting portion 36, and a hooking portion 38. The first pivot portion 31 is connected pivotally to the connecting end 21 of the linking arm 16. In this embodiment, the first pivot portion 31 is formed with a slot 34. The connecting end 21 of the linking arm 16 is formed with a pivot pin 22 that extends into the slot 34 to couple pivotally the first pivot portion 31 to the linking arm 16 about a first vertical axis parallel to the guide pin 30, and a C-shaped engaging unit 46 that is mounted on the pin 22 to retain the first pivot portion 31 on the pin 22. The second pivot portion 33 is connected pivotally to the housing 10. In this embodiment, the housing 10 is formed with a socket 42 for mounting pivotally the second pivot portion 33 about a second vertical axis parallel to the guide pin 30. A screw 44 extends through a hole 40 in the ejecting member 32 and engages threadedly the socket 42. The first pivot portion 31, the second pivot portion 33 and the ejecting portion 36 are disposed in substantially the same line. The second pivot portion 33 is disposed between the first pivot portion 31 and the ejecting portion 36. The hooking portion 38 forms an angle with the ejecting portion 36. The ejecting portion 36 is retracted in the housing 10, and the hooking portion 38 extends out of the housing 10 via the ejector opening 12 so as to engage the engaging hole 62 in the rear wall 63 of the notebook computer 60 when the linking arm 16 is in the non-operated position, as best illustrated in FIG. 3. The ejecting portion 36 extends out of the housing 10 via the ejector opening 12 so as to be adapted to push the rear wall 63 of the notebook computer 60 away from the front wall 13, and the hooking portion 38 is retracted in the housing 10 when the linking arm 16 is in the operated position, i.e., the operating cap 26 of the linking arm 16 is pushed in the direction of the arrow (A) as shown in FIG. 4. The coil spring 20 provides a biasing force for biasing the linking arm 16 to the non-operated position. In this embodiment, the coil spring 20 has a first end 201 mounted on the housing 10 and an opposite second end 202 mounted on the ejecting member 32 adjacent to the ejecting portion 36. Alternatively, the second end 202 of the coil spring 20 may be mounted on the ejecting member 32 adjacent to the hooking portion 38. The coil spring 20 pulls the ejecting member 32 to retract the ejecting portion 36 into the housing 10 and, in turn, bias the linking arm 16 to the non-operated position.

Figure 5:
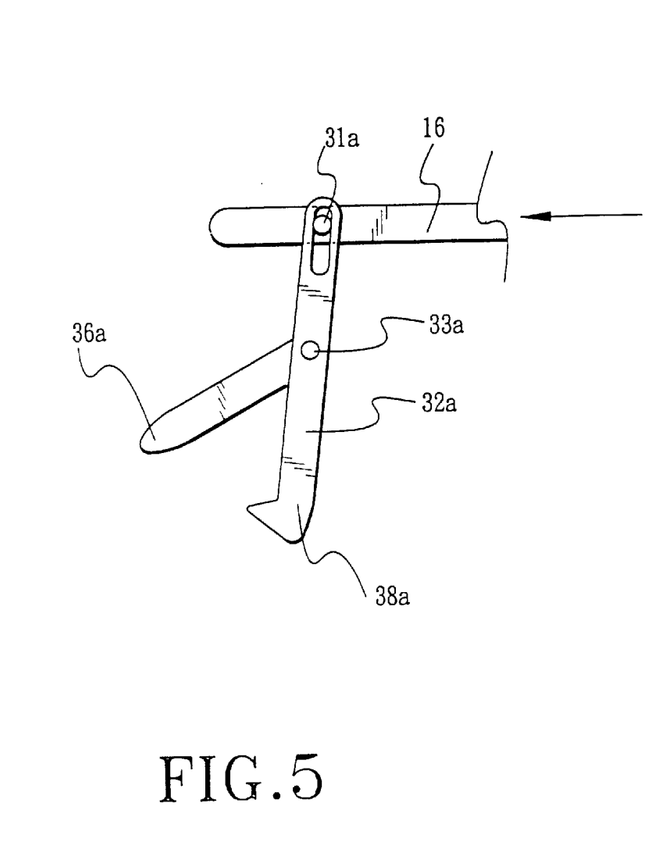
FIGS. 5 to 9 are fragmentary schematic views showing second to sixth preferred embodiments of this invention, respectively.
Figure 6:
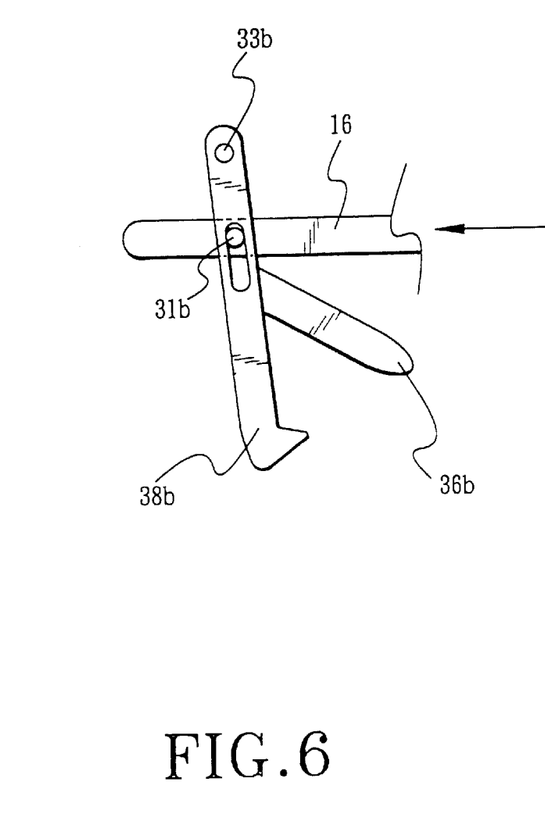
Figure 7:
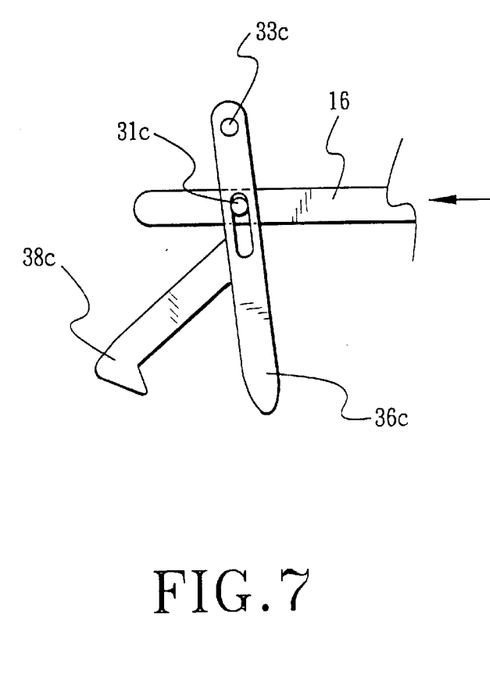
Figure 8:
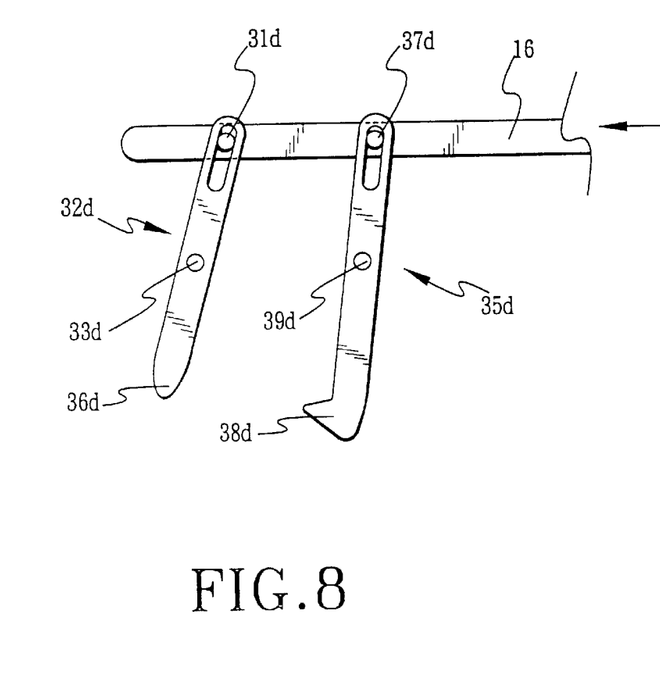
Figure 9:
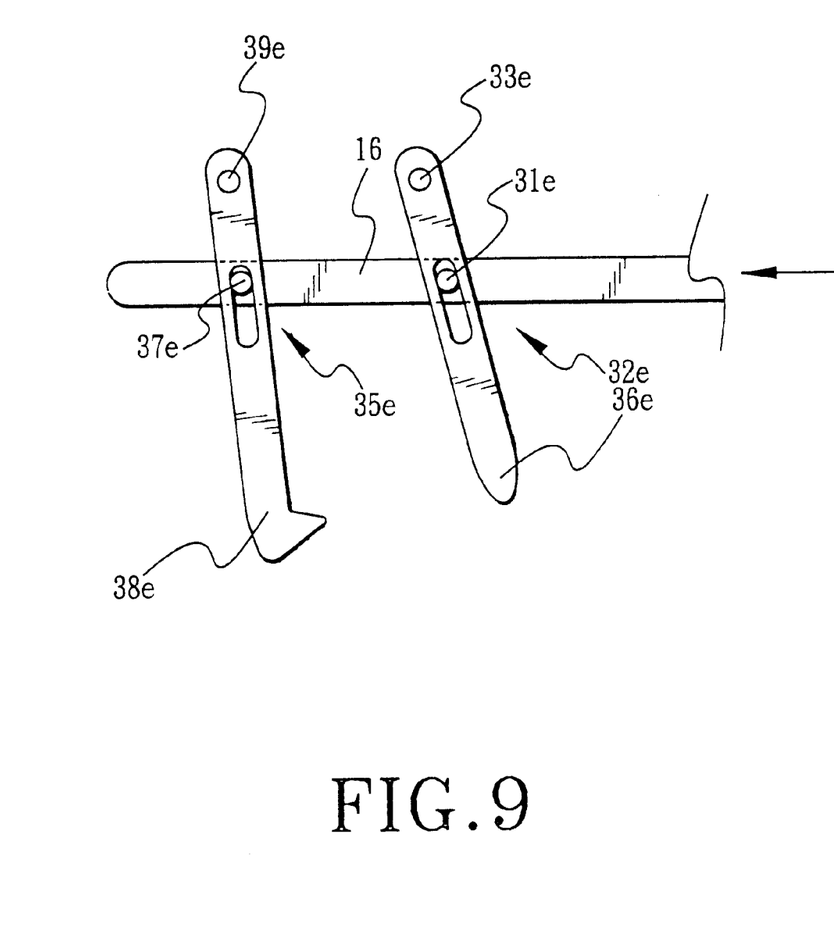

FIGS. 5 to 9 respectively illustrate the second to sixth preferred embodiments of this invention. In FIG. 5, the first pivot portion 31a, the second pivot portion 33a and the hooking portion 38a of an ejecting member 32a are disposed in substantially the same line. The second pivot portion 33a is disposed between the first pivot portion 31a and the hooking portion 38a. The ejecting portion 36a is disposed on the left of the hooking portion 38a and forms an angle with the hooking portion 38a. In FIG. 6, the first pivot portion 31b, the second pivot portion 33b and the hooking portion 38b are disposed in substantially the same line. The first pivot portion 31b is disposed between the second pivot portion 33b and the hooking portion 38b. The ejecting portion 36b is disposed on the right of the hooking portion38b and forms ananglewiththe hookingportion38b. The direction of the hook end of the hooking portion 38b differs from that of the hooking portion 38a of FIG. 5. In FIG. 7, the first pivot portion 31c, the second pivot portion 33c and the ejecting portion 36c are disposed in substantially the same line. The first pivot portion 31c is disposed between the second pivot portion 33c and the ejecting portion 36c. The ejecting portion 36c is disposed on the right of the hooking portion 38c and forms an angle with the hooking portion 38c. In FIG. 8, the docking station further includes a hooking member 35d having a third pivot portion 37d connected pivotally to the connecting end 21 of the linking arm 16, a fourth pivot portion 39d connected pivotally to the housing, and a hooking portion 38d. The first pivot portion 31d, the second pivot portion 33d and the ejecting portion 36d of an ejecting member 32d are disposed in substantially the same line on the left side of the hooking member 35d. The second pivot portion 33d is disposed between the first pivot portion 31d and the ejecting portion 36d. The third pivot portion 37d, the fourth pivot portion 39d and the hooking portion 38d are similarly disposed in substantially the same line. The fourth pivot portion 39d is disposed between the third pivot portion 37d and the hooking portion 38d. The hooking portion 38d is retracted in the housing (not shown) when the linking arm 16 is in the operated position, and extends out of the housing via the ejector opening so as to engage the rear wall of the notebook computer when the linking arm 16 is in the non-operated position. In FIG. 9, unlike the embodiment of FIG. 8, the first pivot portion 31e, the second pivot portion 33e and the ejecting portion 36e of an ejecting member 32e are disposed in substantially the same line. The first pivot portion 31e is disposed between the second pivot portion 33e and the ejecting portion 36e. The third pivot portion 37e, the fourth pivot portion 39e and the hooking portion 38e of an hooking member 35e are also disposed in substantially the same line on the left side of the ejecting member 32e. The third pivot portion 37e is disposed between the fourth pivot portion 39e and the hooking portion 38e.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A docking station for a notebook computer that has a rear wall provided with a first connector set, the rear wall defining a longitudinal axis, said docking station comprising:

a housing having a front wall adapted to be disposed adjacent to and parallel to the rear wall of the notebook computer, said front wall being provided with a second connector set that is adapted to connect electrically and mechanically with the first connector set, said front wall being formed with an ejector opening, said housing being further formed with an access opening; and an ejector device including an elongate linking arm disposed in said housing and parallel to said front wall, said linking arm being movable in said housing in a longitudinal direction between operated and non-operated positions, said linking arm having a connecting end and an operating end accessible via said access opening to permit movement of said linking arm from the non-operated position to the operated position, an ejecting member disposed in said housing adjacent to said ejector opening, said ejecting member having a first pivot portion connected pivotally to said connecting end of said linking arm, a second pivot portion connected pivotally to said housing, and an ejecting portion that is retracted in said housing when said linking arm is in the non-operated position, and that extends out of said housing via said ejector opening so as to be adapted to push the rear wall of the notebook computer away from said front wall when said linking arm is in the operated position, and a biasing member for biasing said linking arm to the non-operated position.

2. The docking station as claimed in claim 1, wherein said access opening is spaced apart from said ejector opening in the longitudinal direction.

3. The docking station as claimed in claim 2, wherein said access opening is formed in said front wall.

4. The ejector device as claimed in claim 1, wherein said linking arm is formed with a longitudinal slot, said housing being formed with a guide pin that extends into said slot to guide movement of said linking arm in the longitudinal direction.

5. The docking station as claimed in claim 1, wherein said operating end of said linking arm has an operating cap mounted thereon.

6. The docking station as claimed in claim 1, wherein said housing is formed with a socket for mounting pivotally said second pivot portion of said ejecting member thereon.

7. The docking station as claimed in claim 1, wherein said first pivot portion of said ejecting member is formed with a slot, said connecting end of said linking arm being formed with a pivot pin that extends into said slot to couple pivotally said first pivot portion of said ejecting member to said linking arm.

8. The docking station as claimed in claim 1, wherein said second pivot portion of said ejecting member is disposed between said first pivot portion and said ejecting portion.

9. The docking station as claimed in claim 1, wherein said biasing member includes a coil spring having a first end mounted on said housing and an opposite second end mounted on said ejecting member, said coil spring pulling said ejecting member to retract said ejecting portion into said housing and, in turn, bias said linking arm to the non-operated position.

10. The docking station as claimed in claim 9, wherein said second end of said coil spring is mounted on said ejecting member adjacent to said ejecting portion.

11. The docking station as claimed in claim 1, wherein said ejecting member further has a hooking portion that is retracted in said housing when said linking arm is in the operated position, and that extends out of said housing via said ejector opening so as to be adapted to engage the rear wall of the notebook computer when said linking arm is in the non-operated position.

12. The docking station as claimed in claims 11, wherein said first pivot portion, said second pivot portion and said ejecting portion are disposed in substantially the same line, said hooking portion forming an angle with said ejecting portion.

13. The docking station as claimed in claim 11, wherein said first pivot portion, said second pivot portion and said hooking portion are disposed in substantially the same line, said hooking portion forming an angle with said ejecting portion.

14. The docking station as claimed in claim 1, wherein said first pivot portion of said ejecting member is disposed between said second pivot portion and said ejecting portion.

15. The docking station as claimed in claim 1, further comprising a hooking member having a third pivot portion connected pivotally to said connecting end of said linking arm, a fourth pivot portion connected pivotally to said housing, and a hooking portion that is retracted in said housing when said linking arm is in the operated position, and that extends out of said housing via said ejector opening so as to be adapted to engage the rear wall of the notebook computer when said linking arm is in the non-operated position.

16. The docking station as claimed in claim 15, wherein said third pivot portion of said hooking member is disposed between said fourth pivot portion and said hooking portion.

17. The docking station as claimed in claim 15, wherein said fourth pivot portion of said hooking member is disposed between said third pivot portion and said hooking portion.

\* \* \* \* \*